United States Patent [19]

Cardone et al.

[11] 4,333,313

[45] Jun. 8, 1982

[54] GAS POWERED, CLOSED LOOP POWER SYSTEM AND PROCESS FOR USING SAME

[75] Inventors: Joseph T. Cardone, Northridge; Kenneth J. Shatz, Hollywood, both of Calif.; James M. Dill, Ft. Lauderdale, FL

[73] Assignee: Ecological Energy Systems, Inc., Northbrook, Ill.

[21] Appl. No.: 65,537

[22] Filed: Aug. 10, 1979

Related U.S. Application Data

[63] Continuation-in-part of Ser. No. 9,765, Feb. 6, 1979, abandoned.

[51] Int. Cl.$^3$ .............................................. F01K 25/06
[52] U.S. Cl. ........................................ 60/649; 60/673
[58] Field of Search .............. 60/649, 673, 509, 511, 60/512; 137/893

[56] References Cited

U.S. PATENT DOCUMENTS

| 493,722 | 3/1893 | Horack | 60/649 |
| 3,505,810 | 4/1970 | Mamiya | 60/649 X |
| 4,186,772 | 2/1980 | Handleman | 137/893 X |
| 4,195,485 | 4/1980 | Brinkerhoff | 60/673 X |

*Primary Examiner*—Allen M. Ostrager
*Assistant Examiner*—Stephen F. Husar
*Attorney, Agent, or Firm*—Dressler, Goldsmith, Shore, Sutker & Milnamow, Ltd.

[57] ABSTRACT

This invention relates to a gas powered, closed loop power generating system which generates power substantially as a result of the flow of gas through its power generating means. Gas flows through the power generating means because of a pressure drop caused by dissolving the gas in a solvent medium on the exit side of the power generating means. The solution is then separated into the solvent medium, and the gas. The gas pressure is raised and it is then fed back into the power generating means while the separated solvent medium is recycled to redissolve more exiting gas. A process for generating power is also disclosed.

20 Claims, 4 Drawing Figures

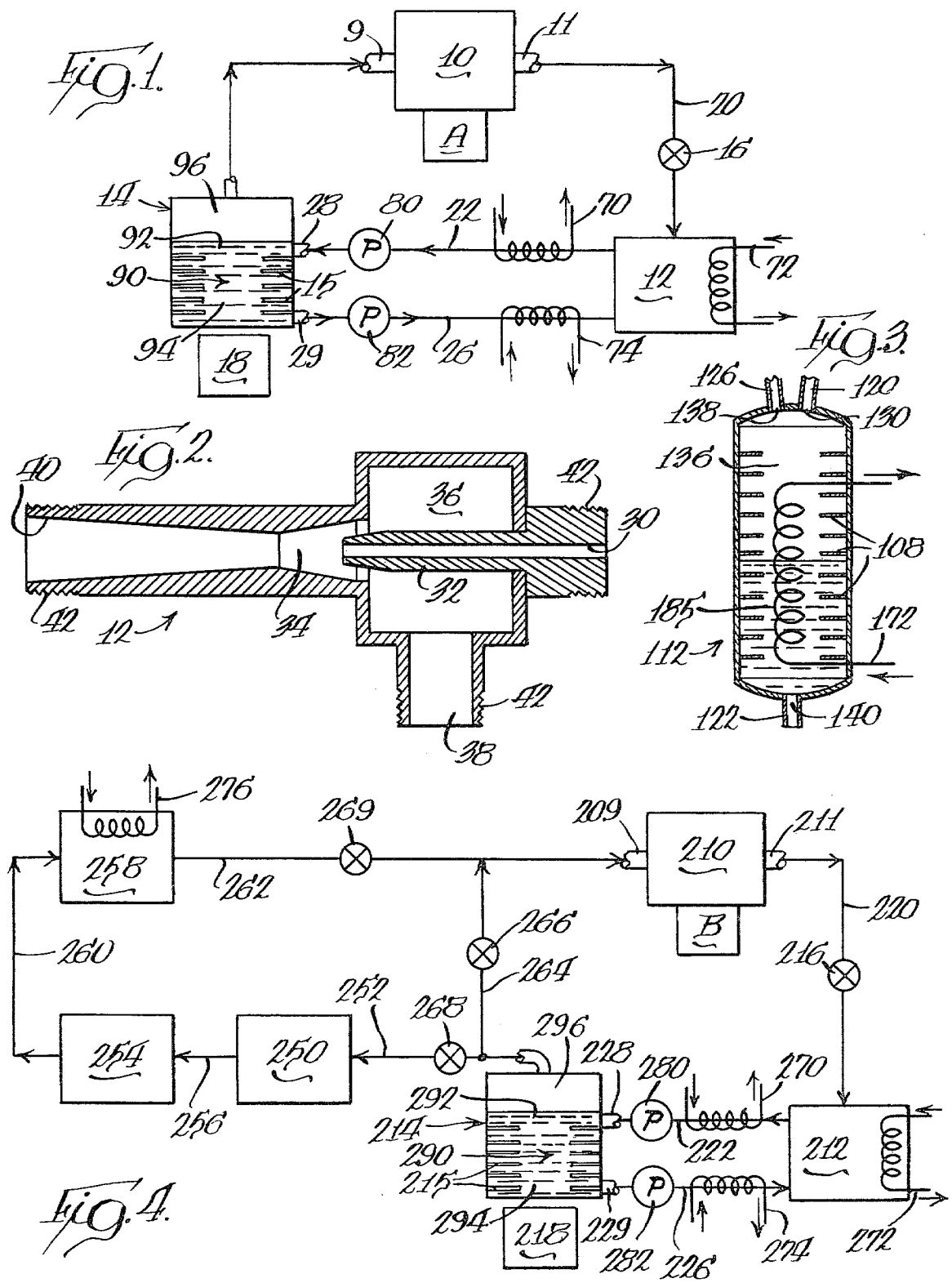

4,333,313

GAS POWERED, CLOSED LOOP POWER SYSTEM AND PROCESS FOR USING SAME

CROSS-REFERENCE TO RELATED APPLICATION

This is a continuation-in-part of our prior application Ser. No. 009,765, filed on Feb. 6, 1979, now abandoned.

TECHNICAL FIELD

The present invention relates to a system and process for producing power.

BACKGROUND ART

Fossil fuels are presently being used in tremendous quantities in this country and it is said that such fuels, particularly oil and natural gas, may be depleted by the beginning of the 21st century, while there may be sufficient coal to last for an additional one hundred or so years. Power from nuclear fission is relatively expensive because of initial outlays for power plant manufacture, and difficulties arise in handling the waste products from this source of power. Power production from nuclear fission may not be produced for many years, if ever. The generation of power from solar energy has recently stirred a great deal of interest, but presently, solar power is feasible only in small units, such as for an individual home, and solar power producing units are extremely expensive to install relative to the amount of useful power obtained; additionally solar power is less useful in northern climates.

British Pat. No. 29,690 to Aynton discloses engines which are operated by the dissolution of gasses, such as ammonia, in solvents, such as water. While the Aynton engine system operates cyclically, part of the cyclical path is open to the atmosphere. Thus, while the system operates in a cycle, or loop, the loop is not a "closed loop" as is the system described hereinbelow. Furthermore, because the Aynton loop is open to the atmosphere, the pressure differentials therein are between atmospheric pressure and below, or a partial vacuum. Thus, the pressure drops obtained in Aynton's system can at most be one atmosphere. Additionally, in the Aynton system, the gaseous ammonia inlet to the dissolving chamber is placed above the water. In that configuration, the water becomes saturated with ammonia near its surface thereby becoming unable to accept more ammonia and causing a back pressure to build up into the engine until such back pressure equals that of the pressure source, thereby stopping the engine.

Another British patent, No. 294,882 to the International General Electric Company, Incorporated, also teaches an engine which is run by a gas, such as ammonia, which is dissolved in a solvent, such as water. In this patent, both the inlet for fresh water and the outlet for solution to be separated are located near the bottom of the ammonia-water mixing tank. Ammonia gas addition occurs above the surface of the liquid in the mixer, thereby causing a solvent saturation problem as discussed above for the Aynton system. With the gas and liquid inlet and outlet configurations as taught therein, the liquids coming into and going out from the mixing or dissolving chamber have approximately the same ammonia content and the incoming ammonia does not mix directly with the freshly separated solvent. Additionally, the solution richest in ammonia, enters the separating boiler near the bottom thereof, a region which is otherwise poorest in ammonia, while the solvent to be recirculated for resolution with ammonia, comes from the upper portion of the boiler which is the portion richest in ammonia.

U.S. Pat. No. 3,945,211 to Rowe and entitled "Vacuum Engine" describes a power generating system in which power to run an engine is derived from a vacuum created by the dissolution of ammonia in water. Rowe's system comprises an engine having at least one variable volume chamber in which a vacuum is developed, or alternatively the vacuum may be developed at a tank remote from the variable volume engine of his system. (As used in Rowe "vacuum" is understood to be a pressure below atmospheric pressure). In its principal embodiment, the Rowe system is a "one path" system, that is, the water and ammonia are mixed to generate power and then must be retained, collected and either recycled remote from the power producing engine or used in some other process. In addition, he discloses the use of a "small conversion plant" which may be established adjacent to the engine wherein the water and ammonia gas may be regenerated.

There are several disadvantages to the Rowe "Vacuum Engine". One of these disadvantages is that the system must work with one portion being under vacuum, which limits the available pressure differential running the engine to one atmosphere. Use of vacuum also results in having to use costly sealing techniques to insure that there are no leaks in the system which will allow the internal pressure to come to atmospheric and thereby stop the engine. A second disadvantage is that the system is limited to the use of a variable volume engine, thereby limiting the generality of its use. Another disadvantage of the Rowe system is that in embodiments where the water and ammonia are not mixed within the variable volume engine, but rather in a separate solution tank at a location remote from the engine, the engine exhaust manifold must communicate with the solution tank such that the exit from the manifold is below the level of the liquid in the solution tank thereby lessening the effect of dissolution of the ammonia gas with the dissolving liquid because the incoming gas is dissolved in a solution already containing relatively large amounts of the gas. Yet another disadvantage in the Rowe system is that there is no account taken of the heat of solution generated when ammonia gas is dissolved in water. In certain of the Rowe embodiments this heat of solution could cause a back pressure buildup and eventually shut down the engine.

DISCLOSURE OF THE INVENTION

The present invention relates to a gas powered, closed loop power generating system which is comprised of a power generating mechanism which generates its power substantially as a result of the flow of a pressurized gas therethrough from an inlet to an outlet. The power generating mechanism is connected to a device for dissolving the gas in a solvent medium for the gas to produce a solution, thereby lowering the pressure of the gas. The dissolving device is connected to an apparatus for separating the dissolved gas from the solvent medium and increasing the pressure of the gas, the solution being impelled from the dissolving device to the separating apparatus. The separating apparatus contains a body of the solution, which body includes an upper portion and lower portion, and there is a space above the body of solution within the separating apparatus. The dissolving device is connected to the separating apparatus near the upper portion of the body of solution therein. The space above the body of solution in the separating apparatus is connected to the inlet of the power generating mechanism to supply separated gas thereto. The outlet of the power generating mechanism is connected to the dissolving device to pass the gas thereto. Separated solvent medium is supplied to the dissolving device from the lower portion of the body of solution in the separating apparatus to a zone in the dissolving device wherein the separated solvent comes into direct contact with the gas to form the solution, whereby the separated solvent medium is recycled into the power generating system.

A closed loop process for producing mechanical power is also disclosed. In this process, a gas is supplied at a first pressure to a power generating mechanism which generates power substantially as a result of the flow of gas therethrough; the gas is allowed to exit therefrom, thereby generating mechanical power. The exiting gas is then dissolved in a solvent medium having a high solvent power for that gas to form a solution at a zone wherein the solvent medium comes into direct contact with the gas. This dissolution lowers the pressure of the exiting gas relative to the gas flowing into the power generating mechanism, whereby the gas flows through the mechanical power generating mechanism as a result of the pressure differential. A separating apparatus is provided having a body of the solution therein, which body of solution has an upper body portion and a lower body portion. The solution is impelled to the upper body portion of the solution within the separating apparatus. Sufficient heat is added to the solution to substantially separate the dissolved gas from the solvent medium and to thereby increase the pressure of the separated gas. The separated solvent medium from the lower body portion of the solution within the separating apparatus is supplied to a zone in the dissolving device wherein the separated solvent comes into direct contact with the gas, whereby the separated solvent medium is recycled into the power generating system. The pressure of the separated gas is readjusted to the first pressure and then is recycled into the power generating mechanism as substantially the sole source of the gas.

BRIEF DESCRIPTION OF DRAWINGS

In the accompanying drawings forming part of the specification,

FIG. 1 is a schematic diagram of an embodiment of the closed loop energy producing system of the present invention in which arrows indicate the direction of flow within the system;

FIG. 2 is a cross-section view of a dissolving device of the present invention;

FIG. 3 is a schematic cross-section view of another embodiment of a dissolving device of the present invention; and FIG. 4 is a schematic diagram of another embodiment of the present invention in which arrows indicate the direction of flow.

DETAILED DESCRIPTION OF THE INVENTION

While this invention is susceptible of embodiment in many different forms, there are shown in the drawings and will herein be described in detail preferred embodiments of the invention. It should be understood, however, that the present disclosure is to be considered as an exemplification of the principles of invention and is not intended to limit the invention to the embodiments illustrated.

In the following description, two digit numerals are used to refer to the illustrations in FIGS. 1 and 2. Three digit numerals in the one hundred series are used to refer to the illustration in FIG. 3, while three digit numerals in the two hundred series are used to refer to the illustration in FIG. 4. The same last two digits in each numeral designate similar or functionally analogous elements in the various embodiments.

The gas powered energy producing system of the present invention is a closed loop system. By "closed", it is meant that the system's gaseous and liquid components are all contained within various machines or piping so that there are no intentional openings to the atmosphere. The use of the word "loop" herein is to imply that the gaseous and liquid components are used in the system, separated and reused or recycled in loops, so that barring leaks, once the gaseous and liquid components are charged into the system, they need not be recharged.

This closed loop energy producing system operates by means of a gas pressure differential. This pressure differential need not have any portion of the system under partial vacuum, i.e., at less than atmospheric pressure. Thus, the highest pressure may be at one pressure which is below atmospheric, while the lowest pressure is at a still lower, sub-atmospheric pressure, or the highest pressure may be above atmospheric pressure while the lowest pressure is below atmospheric pressure, or the entire pressure range may be above one atmosphere. Preferably, the highest pressure is above one atmosphere and the lowest pressure is at or slightly above atmospheric pressure, with a suitable operating pressure range being from about 25 atmospheres for the high pressure to about one atmosphere for the low pressure.

The pressure differential which operates the present system refers to the pressure of a gas enclosed within the closed loop system of this invention which is shown schematically in FIGS. 1 and 4. According to the scheme shown in FIG. 1, wherein arrows indicate the direction of flow within the system, the gas enters the power generating mechanism 10 at a first pressure. The gas is pushed through the power generating mechanism 10 by the pressure head upstream thereof and is also drawn through said mechanism 10 as a result of its dissolution in an appropriate solvent medium within the dissolving device 12. Dissolution of the gas in the solvent medium lowers the gas pressure downstream of said mechanism 10 which allows the gas to flow through the power generating mechanism 10 and thereby generate useful power.

The presently preferred gas is ammonia and the presently preferred solvent medium is water. Other gasses and other solvent media having high solvent power for the gases may also be used to generate power. Ammonia and water are preferred as they are both relatively inexpensive, and most importantly, ammonia and water have a great affinity for each other. For example, at atmospheric pressure, 1 ml. of water at 0° C. will dissolve about 1175 ml. of ammonia gas, and at 20° C. 1 ml, of water will dissolve about 700 ml. of ammonia gas. It is this ammonia-water affinity which causes the gas to be drawn through the power generating mechanism 10 on dissolution.

While ammonia reacts with water in some degree to form ammonium hydroxide, it will evaporate from water at ambient temperatures and can be expelled from solution on heating. Other gasses which are also readily soluble in water are either difficult to separate from the water or are themselves more corrosive either as gasses or as water solutions than is ammonia. Examples of the latter group gasses include sulfur trioxide, hydrogen chloride and hydrogen bromide, and the like.

Other solvent media include alcohols, such as ethanol and acids such as acetic acid, and mixtures thereof with themselves or water. In general, gasses and solvent media are selected which allow at least about 200 volumes of gas to dissolve in one volume of solvent under the conditions that prevail in the dissolving device. Ammonia gas and water will be used illustratively hereinbelow as a desirable gas and solvent medium for the invention.

The power generating mechanism 10 of the present invention generates its power as a result of the flow of a pressurized gas therethrough from an inlet 9 to an outlet 11. The power generated by the power generating mechanism 10 is mechanical power. This mechanical power may result in the formation of electrical energy as when the power generating mechanism 10 is used to drive an electric generator or alternator A.

The form of the power generating mechanism can be varied. In some embodiments, a variable volume power generating mechanism such as a gas motor, or a reciprocating piston engine may be used. Turbines such as an impulse turbine, a reaction turbine, and a combination turbine may also be used. In present practice, a turbine is preferred, and will be used hereinbelow as illustrative. The power generating mechanism 10 will thus be designated as a "turbine."

The turbine 10 is connected through appropriate connecting or conduit means 20, such as piping, to a dissolving device 12 wherein the ammonia and water are mixed and the ammonia dissolved to thereby lower its pressure. The mixing and dissolution may take place in several fashions, but since the system efficiency is in part dependent upon the rate of dissolution, a fast dissolution of ammonia in water is preferred. The schematic drawing of FIG. 1 shows the dissolving and separating functions as being separated. However, these functions may be carried out within a single housing.

Presently, it is preferable to have the dissolution of the ammonia and water take place both physically and functionally outside of the separating apparatus 14. When ammonia is dissolved in pure water, about 8.4 kilocalories per mole of ammonia dissolved are released as heat of solution. For solvents such as water containing small amounts of ammonia, as are preferred herein, and are discussed hereinbelow, large amounts of heat are also generated upon the dissolution of ammonia, although somewhat less than the 8.4 kilocalories per mole is generated. Because of the large amount of heat that is built up, the freshly prepared solution of ammonia in water is preferably cooled somewhat prior to its being impelled into the separating apparatus 14. Thus, a separate dissolving device 12 is used.

Cooling of the solution is effected to assist the impelling mechanism, or pump, 80 lest it cavitate due to its efforts in pumping a liquid having a readily vaporizable, heated gas dissolved therein. Thus, a heat transfer device such as the cooling coil 72 may be supplied within the mixing mechanism 12 whereby the heat generated on mixing ammonia and water may be carried away from the solution produced thereby. The heat of solution which is transferred during the cooling of the solution need not and should not be wasted, and preferably may be used as discussed hereinbelow. Additional and/or alternative cooling may also be provided outside of the mixing or dissolving device 12 as is shown schematically in FIG. 1 by a heat transfer device such as cooling coil 70.

While several modes of mixing are possible as has already been discussed, it is preferable that the separated solvent medium from the lower portion of the body of solution in the separating apparatus 14 (as discussed hereinbelow) be supplied to a zone within the dissolving device 12 wherein the separated solvent comes into direct contact with the ammonia gas to effect dissolution as quickly as possible. Such fast dissolution assists in assuring the greatest possible pressure drop between the high and low pressure points in the system. Two embodiments of the dissolving device 12 are illustrated in FIGS. 2 and 3.

One embodiment of the dissolving device 12 is illustrated in cross-section in FIG. 2 This dissolving device has an ammonia entry port 30 connected to an ammonia entry nozzle 32 which allows the ammonia to flow into a venturi throat region 34. The flow of ammonia through the dissolving device 12 and out thereof via the dissolving device outlet 40 and its increase in velocity as it passes the venturi region 34 reduces the pressure within the dissolving device chamber 36 and thereby draws the water into the dissolving device via the water inlet 38. The water may also be pumped therein by pump or impeller 82.

Dissolution of the ammonia gas in water as the two are contacted and mixed in the venturi region or zone, downstream of the entry nozzle 42, further reduces the pressure within the dissolving means chamber 36, further augmenting the flow of water and ammonia gas into the dissolving means 12. When the dissolving device 12 of FIG. 2 is used, cooling may be supplied to the solution upstream of the pump 80 or 280 shown in FIGS. 1 and 4, respectively, by cooling coils 70 and 270 shown in those respective Figures.

Dissolving mechanism 12 is connected to the remainder of the closed loop system by appropriate means, such as for example, threaded fittings 42, and suitable conduit means such as piping 22. Other appropriate modes of attachment are also well-known to those skilled in the art. The precise shapes and dimensions of the nozzle 32, the dissolving means chamber 36 and venturi mixing region 34 are known to, or may be easily determined by those skilled in the art.

Another embodiment of the dissolving device 112 is shown in the cross-section schematic view of FIG. 3. This dissolving device 112 has therein an ammonia or gas entry port 130 at a terminus of conduit means 120 and a solvent medium or water inlet 138 at a terminus of conduit means 126. The entry port 130 and inlet 138 are so arranged that as the ammonia and water enter the chamber 136 of the dissolving device 112 they are directed to come into direct contact in a zone therewithin to thereby form a solution. The solution formation or dissolution reduces the pressure within the dissolving device chamber thereby augmenting the flow of both water and ammonia therein. Additionally, baffles 108 may be used to further assist the dissolution process by increasing the possible surface area of contact for the ammonia and water.

A heat transfer device such as a cooling coil 172 may be used within within the dissolving device 112 to cool the solution and thereby assist in preventing the pump or impelling means 80 or 280 of FIGS. 1 and 4, from cavitating. Cooling within the dissolving device 112 also helps prevent a build up of gas pressure therewithin, which pressure would tend to retard the flow of gas into the dissolving device 112, thereby retarding power production. A cooler dissolving device 112 also improves dissolution of the gas since more gas is soluble at a lower temperature than at a higher temperature.

The dissolving device 112 preferably contains a body of the solution 185. The presence of this body of solution 185 helps to even out the rate of liquid flow within the system. The presence of the baffles 108 within the body of solution 185 also helps to retard the convectional mixing which can occur in ammonia-water solutions having differing amounts of ammonia therein or which may be of differing temperatures. A quantity of solution 185 may be placed in the dissolving device prior to startup of the system.

The solution flows out of the dissolving device 112 via the dissolving device outlet 140 and into conduit means 122. As discussed hereinabove, additional and/or alternative cooling of the solution downstream of the dissolving mechanism, but upstream of the pump 80 or 280 may also be employed as shown in FIGS. 1 and 4, by heat transfer devices such as cooling coils 70 and 270 respectively.

Upon leaving dissolving device 12 (or 112), the ammonia-water solution is impelled to the separating apparatus 14 by a pump or impelling mechanism 80 in conduit or connecting means 22.

The separating apparatus 14 is basically a distillation apparatus, and has a body of solution 90 therein and a space 96 thereabove. A body of solution 90 is preferably placed within the separating apparatus prior to startup of the system. This body of solution 90 has an upper body portion 92 and lower body portion 94. In such a still, the ammonia-water solution is separated into its component parts of water and ammonia.

While water is the preferred solvent medium, the solvent medium need not be entirely ammonia free. Thus, the separation of ammonia from the solution need not be complete and the dissolving medium, water may be fed into the dissolving device 12 containing some ammonia. However, the better the separation of ammonia from the solvent medium, the more efficient is the later dissolution of ammonia into the solvent medium, and therefore the more efficient is the total energy producing system. The choice as to how pure, or free from ammonia, the dissolving medium water, has to be is basically an economic choice which the user of the system has to make, however, it is preferred that the solvent medium be substantially free of ammonia. A useful separation results in water containing about 5% by weight ammonia.

The term "water" as used herein denotes both water, and water containing some ammonia which is suitable for dissolving further ammonia. Means for achieving effective ammonia separations from water and vice versa are well known in the art.

It has been found that as ammonia is driven off from the solution, a concentration gradient in the remaining ammonia-water solution is achieved within the still. The ammonia-water solution being less dense than water itself, solutions containing larger quantities of ammonia remain in the upper portion 92 of the body of solution in the distillation apparatus, while solutions containing less ammonia settle near the bottom in the lower body portion 94. Means for retarding mixing of the differing densities of solution such as by the use of baffles 15 within the separating apparatus are known to the art.

It is therefore preferred that the entering solution which is richest in ammonia, from conduit 22 and impeller 80, be introduced through entry port 28 into the upper portion 92 of the body of solution 90 in the separating apparatus. Most preferably, the solution enters the body of solution at a place at which the incoming solution and the solution already present have about the same ammonia concentration. This similarity in ammonia concentrations generally occurs in the upper portion 92 of the body of solution 90. Separated water, suitable for reuse or recycling is preferably removed from the lower portion 94 of the body of solution 90 through exit port 29 at or near the bottom of the separating apparatus 14. This selection of entry and exit locations improves the efficiency of the system's operation as it minimizes disruptions in the distillation process which can be caused by mixing solutions having differing ammonia concentrations (near the inlet), and uses water with the least amount of ammonia for recycling and resolution from the exit. Exit port 29 is connected to an appropriate conduit means 26, such as piping, to return the water to the dissolving device 12.

Heat must be supplied to the separating apparatus to separate the ammonia gas from the solution. The amount of heat required is a function, inter alia, of the temperature of the incoming ammonia-water solution, the amount of ammonia in the solution, the amount of ammonia-water solution present within the separating means at any given time, and the pressure of the ammonia in the vapor phase above the ammonia-water solution within the separating apparatus 14. Since ammonia gas dissolves in water to liberate a relatively large quantity of heat, and the resulting solution is cooled, as discussed hereinabove, some of the heat of solution imparted to the cooling heat exchange medium may be captured and used, for example to help supply heat to separate the ammonia from the water in the separating apparatus 14. An additional quantity of heat input into the separating apparatus is also required as the solution is cooled before entry therein.

Various methods of heating a distillation apparatus are known to the art and may be used in accordance with this invention. Waste heat sources such as from blast furnaces, fossil fuel power generators, boilers and the like may also be employed to provide what is otherwise waste heat to separate the solution back into its components, since only relatively low temperature, i.e., less than about 500°–600° F. are needed for the separation. An independent heat source such as fossil fuel or an electrical heating device may also be employed to heat the solution 90 in the separating apparatus 14. The heating means is shown schematically as element 18.

After separation, the water is fed back to the dissolving device 12 by conduit means 26. Since ammonia is more soluble in cold water than in hot water, some cooling of the solvent medium, water, may be needed prior to its being recycled to redissolve the ammonia gas.

As the instant power generating system derives its power from the pressure drop resulting from the dissolution of ammonia in water, the amount of ammonia which will dissolve in the solvent medium can govern the efficiency of the engine. As stated hereinabove, using pure water as the solvent medium tends to increase the efficiency of the power generating system, while using a solvent medium having ammonia in it tends to decrease the efficiency of the system as the ammonia concentration increases. Similarly, using a colder solvent medium, water, tends to increase the efficiency of the system by dissolving more gas per volume of water than does using a warmer solvent medium. Consequently, the amount of cooling required for the solvent medium is another economic choice which the user must make based upon the efficiency of the system desired and the cost factors in achieving that efficiency.

Sufficient cooling of the recycling solvent medium in connecting means 26, may be achieved simply by the contact of ambient air with the thermally conducting walls of connecting means 26. Alternatively, the return conduit 26 may be cooled by a suitable cooling device such as cooling coil 74. The heat exchange medium within the cooling coil 74 may be one of the cooler fluids circulating within the system such as the cooled solvent medium prior to its entry into the separating apparatus, or the gas which is cooled on leaving the power generating mechanism 10, or the like.

As this invention is presently practiced, cooling of the recycled solvent medium is accomplished by thermally contacting a cold water supply with the thermally conducting conduit means 26. When the energy producing systems of the present invention are used for pumping water from sources such as wells, the pumped well water may be used as a cooling medium for any part of the system which needs cooling, such as the conduit means 26.

The amount of ammonia which is soluble in the solvent medium is also a function of the pressure of the system as well as the temperature and the amount of ammonia already present in the solution. Generally, at a constant temperature and a given amount of predissolved ammonia, as the pressure of the system increases, more ammonia will dissolve in the solvent medium. Thus, the efficiency of the present invention may also be increased by raising the pressure of the ammonia gas upstream of the power generating mechanism 10 and/or the dissolving device 12 so that more gas will dissolve in the solvent medium.

One method of increasing the gas pressure is to use the gas coming from the separating apparatus as a cooling medium within the dissolving device 12, thereby raising its temperature and pressure. This heated and more pressurized gas may then be fed into the power generating mechanism 10 and then into the dissolving device 12.

The upper limit of the system gas pressure is again largely limited by economics, with pressures on the order of about 35 atmospheres or about 525 pounds per square inch (about 37 kg. per cm$^2$) being at about the pressure practical upper limit of economic feasibility. Higher pressures, such as those achieved by superheating techniques may also be used, but these generally require a larger heat input and more costly, high pressure apparatus. As mentioned hereinabove, the preferred operating pressure range is from about one atmosphere to about 25 atmospheres.

Upon being separated from the solvent medium in the separating apparatus 14, the ammonia gas is then recycled from the space 96 above the body of solution 90 into the turbine 10 via an appropriate connecting or conduit means 24. The recycled gas is substantially the sole source of the gas to the power producing turbine 10 with some additional gas having to be added from time to time due to leaks which may be in the system. During the separation process, the pressure of the ammonia gas is raised and it is this pressurized gas which flows into the turbine 10.

Thus, the closed loop power generating system shown schematically in FIG. 1 is completed. The pressurized gas which flows through the turbine 10 thereby generating power, flows out thereof via the connecting conduit 20 into the dissolving mechanism 12. On dissolution in the dissolving device 12 at the zone therein wherein the separated water comes into direct contact with the ammonia, the pressure of the ammonia gas drops, pulling more ammonia through the power generating mechanism 10. The resulting solution then flows via connecting means 22 and impeller 80 into the separating apparatus 14 wherein the ammonia gas and solvent medium, water, are separated and the ammonia gas repressurized. The separated water flows back to the dissolving device 12 by connecting means 26, and the repressurized ammonia gas flows into the turbine 10 via connecting means 24 to complete the closed loop system.

The closed loop power generating system of the present invention may be stopped by shutting down the heating source 18 and thereafter closing valve 16 located in the connecting means 20 between the turbine 10 and the dissolving device 12. Valve 16 is designed so that it may be used to shut off the entire flow of gas from the turbine 10 to the dissolving device 12, or allow such flow to continue essentially unimpaired. Thus, when the other components of the system are capable of acting to the generate power, if the gas is not allowed to flow because the valve 16 is closed, the energy producing system will be in an "off" mode. Conversely, when the valve is opened and the heating source 18 is on, the system will function to produce power. To start the system, the above stopping procedure is reversed. A mechanical starter may also be used to assist start-up of the turbine 10.

The valve 16 may also be used like a throttle to regulate the rate of power production by adjusting its degree of "openness". Thus, the more open the valve 16 is, the more power will be produced, and vice versa.

The valve 16 is shown schematically in FIG. 1 and described above in its presently preferred position, i.e., between the turbine 10 and dissolving device 12. However, as the instant invention is a closed loop system, it may be started, stopped or throttled by placing a valve such as valve 16 between any of the functional portions of the system.

In another embodiment of the present invention, the power generating mechanism 210 may be connected to a pre-existing, or otherwise fabricated ammonia-water refrigeration system. In this embodiment, mechanical power can be generated along with the cooling produced by the refrigeration system, at little, if any reduction in the cooling efficiency. A schematic diagram using a refrigeration system is shown in FIG. 4.

Following FIG. 4, after the ammonia gas is separated in the separating apparatus 214, it is led into a liquefying apparatus 250 via an appropriate connecting means or conduit 252. In the liquefying apparatus, the gaseous, pressurized ammonia is liquefied by means well-known in the art. The liquid ammonia is then carried by a conduit means 256 into a reservoir means 254, wherein a constant supply of liquid ammonia is retained. Prior to start-up of this embodiment of the power system of this invention, a supply of liquefied ammonia may be in the reservoir 254. The liquid ammonia in the reservoir 254 is then fed into a gasifying apparatus 258, via connecting means 260. The liquid ammonia fed into the gasifying apparatus 258 is transformed back into its gaseous state and the pressure of the gas is readjusted to the desired entry pressure for flow into the energy generating mechanism 210 by means well known in the art. The gaseous, pressurized ammonia is fed from the gasifying apparatus 258 into the inlet 209 of the power generating mechanism 210 by connecting means 262. The remainder of the system illustrated schematically in FIG. 4 is essentially the same as that described hereinabove for the scheme in FIG. 1, with the exceptions noted hereinbelow.

Refrigeration in this system is principally supplied by thermal interfacing with the gasification apparatus 258. Thus, a heat transfer agent may be piped through coil 276 to cool some other apparatus (not shown), or it may be used to cool one or more heated portions of the power producing system, which itself may need cooling, such as the dissolving device 212. Additionally, air may be blown across and/or through a radiator (not shown) attached to the gasification apparatus 258 as is well known in the refrigeration art.

Some of the mechanical power producing efficiency of the instant system is lost when a refrigeration unit is used in conjunction with the turbine 210 when compared to a system wherein liquification and regasifiction are not used. However, particularly in situations wherein an ammonia-water refrigeration system is already in place or is contemplated, a benefit may be obtained by using such a refrigeration system to also produce mechanical and/or electrical power since little, if any, refrigeration efficiency is lost.

The process of producing power using the gas powered closed loop power generating system shown schematically in FIG. 4, wherein arrows indicate the direction of flow, may be described by beginning arbitrarily with the inflow of ammonia into the power generating mechanism 210 at a first pressure. The ammonia flows through the power generating mechanism 210 thereby generating mechanical power. This mechanical power may be used to drive an electric generator or alternator B. The exiting ammonia gas from the power generating mechanism 210 then flows through conduit means 220 to the dissolving device 212 where it is dissolved in a solvent medium, preferably water, thereby lowering the pressure of the exiting ammonia relative to the gas flowing into the power generating mechanism 210. This pressure drop causes the gas to flow through the power generating mechanism 210 to generate power. After cooling as in coil 270 and/or coil 272 within the dissolving device 212, the solution is then impelled through conduit means 222 by pump 280 and through inlet 228 to the upper portion 292 of a body of solution 290 within separating apparatus 214. The incoming solution again preferably enters the body of solution 290 at a place at which the concentration of ammonia in the incoming solution is about that in the body of solution 290. This place is generally in the upper body portion 292, as discussed hereinabove. Sufficient heat is added to the ammonia-water solution by the heating means 218 to substantially separate the dissolved ammonia gas from the solution and to thereby increase the pressure of the separated gas. The water separated in this step is recycled preferably with cooling, from the lower portion 294 of the body of solution 290 in the separating apparatus 214, back to the dissolving device 212 through outlet 229 and conduit means 226. The separated, pressurized ammonia gas then flows from the space 296 above the body of solution 290 in the separating apparatus through conduit means 252 to the liquefying apparatus 250 where it is liquefied. The liquid ammonia is then passed via conduit means 256 into the reservoir means 254 where it is stored. The liquid ammonia flows through conduit means 260 from the reservoir means 254 to the gasifying means 258 where it is transformed into its gaseous state with cooling and its pressure is adjusted to the first pressure for recycling into the power generating means 210.

As stated in relation to the first described embodiment, the dissolving device 212 may be within the same housing as the separating apparatus 214, or preferably, is a separate portion of the total energy producing system as discussed hereinabove in relation to FIGS. 1, 2 and 3. Again, it is preferable that the separated solvent medium come into direct contact with the gas in a zone within the dissolving mechanism. A pump or impelling means 282 may also be used in conduit 226 to assist the flow of the recycled solvent medium to the dissolving device 212, as may a pump 282 be used to impell the recycled water back to the dissolving device 212, particularly when the device shown in FIG. 2 is employed. Cooling may be given to the recycled solvent medium by coil 274. Additionally, the power generating mechanism 210 may be one of several types of engine as described hereinabove, but preferably, the power generating mechanism 210 is again a turbine.

As was described in relation to the closed loop system shown schematically in FIG. 1, this embodiment of the present invention may be started, stopped or its rate of energy production governed by a valve 216 placed between any two of the connected functional parts of the system and by starting, stopping or adjusting the heat generated by heating means 218. An example of a suitable location for valve 216 is shown in FIG. 4 by the placement of the valve 216 between the power generating mechanism 210 and the dissolving device 212 in connecting means 220.

If desired, and depending on the amount of refrigeration wanted, a portion or all of the separated gas from separating apparatus 214 may bypass refrigeration, storage and regasification in elements 250, 254 and 258 and be passed directly from conduit 252 to conduit 262 through conduit 264 and the control valve 266. This is facilitated by use of control valves 268 and 269. Thus, when valves 268 and 269 are closed, and valve 266 is open, the embodiment shown schematically in FIG. 4 becomes functionally equivalent to that shown schematically in FIG. 1. When the control valve 226 is open and valves 268 and 269 are partly open, some of the gas may be liquified, stored and regasified prior to entry into the power generating mechanism 210, while the remainder of the gas passes directly thereto by conduit means 264.

In addition to the various elements described hereinabove in relation to FIGS. 1-4, various surge tanks, control valves, pressure relief valves, temperature and pressure gauges and the like may be incorporated into the system as is desired.

The above detailed description has been given for ease of understanding only. No unnecessary limitations are to be understood therefrom, as modifications will be obvious to those skilled in the art.

We claim:

1. A closed loop process for producing power comprising the steps of:

supplying a gas at a first pressure to a power generating means for generating power as a result of the flow of a gas through said power generating means, and allowing said gas to exit therefrom, thereby generating mechanical power;

dissolving said exiting gas from said power generating means in a solvent medium having high solvent power for said gas within a dissolving means to form a solution at a zone wherein said solvent medium comes into direct contact with said gas, said dissolution lowering the pressure of said exiting gas relative to the gas flowing into said power generating means whereby the gas flows through said mechanical power generating means as a result of the pressure differential, said lowered gas pressure being at least about one atmosphere;

providing a separating means having a body of said solution therein, said body of solution having an upper body portion and a lower body portion;

impelling said solution into said upper body portion of said solution within said separating means;

adding sufficient heat to said solution to substantially separate said dissolved gas from said solvent medium and thereby increase the pressure of the separated gas;

supplying said separated solvent medium from said lower body portion of said solution within said separating means to said zone in said dissolving means wherein said separated solvent comes into direct contact with said gas, whereby said separated solvent medium is recycled into the power generating system;

maintaining a reservoir of liquefied gas;

liquefying a portion of said separated gas and adding said liquefied gas to said reservoir;

gasifying some of said liquefied separated gas from said reservoir and readjusting the pressure thereof to said first pressure;

passing said last-named gasified product to said power generating means as at least a portion of the separated gas supplied thereto; and passing the remainder of said separated gas at said first pressure directly from said separating means to said power generating means.

2. The process of claim 1 wherein said gas within said power generating means moves a piston within a chamber.

3. The process of claim 1 wherein said gas passing through said power generating means provides energy to turn turbine blades.

4. The process of claim 1 wherein said gas is ammonia, and said solvent medium comprises water.

5. The process of claim 1 comprising the additional step of cooling said solution before impelling same into said upper body portion of solution.

6. The process of claim 1 wherein said step of dissolving said exiting ammonia gas in a solvent medium includes:

directing said exiting ammonia gas through a venturi region zone; and introducing said solvent medium into said venturi region whereby said ammonia and solvent medium are directly contacted in the zone of said region, the dissolution of said ammonia in said solvent medium reducing the pressure of the ammonia and increasing the pressure differential between the venturi region zone and the ammonia and solvent medium upstream of said zone to cause increased flow of said ammonia and to cause increased flow of said solvent medium into and through said venturi region zone.

7. The process of claim 1 wherein said step of dissolving the exiting ammonia gas in a solvent medium includes:

directing said exiting ammonia gas into a chamber of said dissolving means;

directing said solvent medium into said chamber to come into direct contact with said ammonia in a zone therewithin to thereby form a solution and reduce the pressure within said chamber; and cooling said solution within said chamber.

8. A gas powered, closed loop power generating system comprising:

(a) a power generating means for generating power as a result of the flow of a pressurized gas at a first pressure therethrough from an inlet to an outlet;

(b) means for dissolving said gas in a solvent medium having a high solvent power therefor, said dissolving means including a zone wherein said gas and said solvent medium come into direct contact to produce a solution, thereby lowering the pressure of said gas relative to said first gas pressure, whereby the gas flows through said power generating means as a result of the pressure differential, said lowered gas pressure being at least about one atmosphere;

(c) means for separating said dissolved gas from said solvent medium and increasing the pressure of said gas, said separating means including a heating means to supply heat to separate said gas from said solvent medium, and thereby increase the pressure of the separated gas, said separating means containing a body of said solution including an upper portion and a lower portion of said body, and containing a space above said body of solution;

(d) means for connecting said space above said body of solution in said separating means to said inlet of said power generating means to supply said separated gas at said first pressure to said power generating means, said connecting means including:

means for liquefying a portion of said separated gas from said separating means;

reservoir means for holding said liquefied, separated gas;

means for transforming said liquefied, separated gas to the gaseous state and for readjusting the pressure thereof to said first pressure; and means for passing said portion of said separated gas and the remainder of said separated gas from said separating means into said power generating means through one inlet thereof;

(e) means for connecting said outlet of said power generating means to said dissolving means;

(f) means for connecting said dissolving means to said upper portion of the body of solution in said separating means and means to impel said solution to said upper portion of said body of solution; and (g) means for supplying the separated solvent medium from the lower portion of the body of solution in said separating zone to said zone in said dissolving means wherein said separated solvent comes into direct contact with said gas, whereby the separated solvent medium is recycled into the power generating system.

9. The closed loop power generating system of claim 8 wherein said power generating means has at least one variable volume chamber.

10. The closed loop power generating system of claim 8 wherein said power generating means is a turbine.

11. The closed loop power producing system of claim 8 wherein said gas is ammonia, and said solvent medium is comprised of water.

12. The closed loop power producing system of claim 8 wherein said dissolving means comprises a straight line conduit for gas flow including a venturi throat for increasing the velocity of said gas flow and thereby decreasing the pressure therein, and a conduit in communication with said venturi throat for the introduction of liquid solvent medium thereto.

13. A closed loop process for producing mechanical power comprising the steps of:
maintaining a reservoir of liquid ammonia;
supplying ammonia gas from said reservoir at a first pressure to a power generating means for generating power as a result of the flow of gas through said power generating means, and allowing said ammonia gas to exit therefrom, thereby generating power;
dissolving the exiting ammonia from said power generating means in a solvent medium for said ammonia in a dissolving means to form a solution at a zone wherein said solvent medium comes into direct contact with said gas, said dissolution lowering the pressure of said exiting ammonia relative to the pressure of said ammonia gas flowing into said power generating means, whereby the ammonia gas flows through said mechanical power generating means as a result of the pressure differential, said lowered ammonia pressure being at least about one atmosphere;
providing a separating means having a body of said solution therein and a space above said body of solution, said body of solution having an upper body portion and a lower body portion;
cooling and then impelling said solution into said upper body portion of said solution within said separating means;
adding sufficient heat to said solution to substantially separate said dissolved ammonia from said solvent medium and to increase thereby the pressure of said ammonia;
supplying said separated solvent medium from the lower body portion of said solution within said separating means to said zone in said dissolving means wherein said separated solvent comes into direct contact with said gas, whereby said separated solvent medium is recycled into the power generating system;
liquefying a portion of said separated ammonia gas, thereby adding to said reservoir of liquefied gas;
gasifying some of said liquid ammonia from said reservoir and adjusting the pressure of said ammonia gas to said first pressure;
recycling said ammonia gas at said first pressure into said power generating means as said gas supply thereto; and
passing the remainder of said separated ammonia gas directly from said separating means to said power generating means.

14. The process of claim 13 wherein said step of dissolving the exiting ammonia gas in a solvent medium includes:
directing said exiting ammonia gas through a venturi region zone; and
introducing said solvent medium into said venturi region whereby said ammonia and solvent medium are directly contacted in the zone of said region, the dissolution of said ammonia in said solvent medium reducing the pressure of said ammonia and increasing the pressure differential between the venturi region zone and the ammonia and solvent medium upstream of said zone to cause increased flow of said ammonia and to cause increased flow of said solvent medium into and through said venturi region zone.

15. The process of claim 13 wherein said step of dissolving the exiting ammonia gas in a solvent medium includes:
directing said exiting ammonia gas into a chamber of said dissolving means;
directing said solvent medium into said chamber to come into direct contact with said ammonia in a zone therewithin to thereby form a solution and reduce the pressure within said chamber; and
cooling said solution within said chamber.

16. The process of claim 13 wherein said gas passing through said power generating means provides energy to turn turbine blades.

17. The process of claim 13 wherein said gas within said power generating means moves a piston within a chamber.

18. A closed loop power producing system comprising:
(a) a turbine to generate power as a result of the flow of pressurized ammonia gas at a first pressure therethrough from an inlet to an outlet;
(b) means for dissolving said ammonia gas from said outlet in a solvent medium for said ammonia gas to produce a solution and thereby lower the pressure of said ammonia gas relative to said first ammonia gas pressure, said lowered gas pressure being at least about one atmosphere;
(c) means for separating said dissolved ammonia from said solvent medium and increasing the pressure of said ammonia, said separating means containing a body of said solution including an upper portion and a lower portion of said body, and containing a space above said body of solution, said separating means additionally having a heating means located in conjunction therewith to provide heat to said separating means to separate said ammonia from said solvent medium;
(d) means for liquefying a portion of said separated ammonia gas, connecting means for connecting said space above said body of solution in said separating means to said liquefying means, and conduit means for passing the remainder of said separated gas to said turbine inlet;
(e) reservoir means for holding said liquefied, separated ammonia gas, and means for connecting said liquefying means to said reservoir means;
(f) gasifying means for transforming said liquefied, separated ammonia gas to the gaseous state, and means connecting said reservoir means to said gasifying means;

(g) means for connecting said gasifying means to said inlet of said turbine, and means connecting said outlet of said turbine to said dissolving means;

(h) means for connecting said dissolving means to the upper portion of the body of solution in said separating means and means to impel said solution to said upper portion of said body of solution, whereby said dissolved ammonia gas is fed into said separating means; and (i) means for supplying the separated solvent medium from the lower portion of the body of solution in the separating means to a zone in said dissolving means wherein said separated solvent comes into direct contact with said ammonia, whereby the separated solvent medium is recycled into the power generating system.

19. The closed loop power producing system of claim 18 wherein said dissolving means comprises a straight line conduit for gas flow including a venturi throat for increasing the velocity of said ammonia gas flow and thereby decreasing the pressure therein, and a conduit in communication with said venturi throat for the introducion of liquid solvent medium thereto.

20. The closed loop power producing system of claim 19 wherein said dissolving means comprises a chamber having an ammonia gas entry port and a solvent medium inlet therein, said entry port and inlet being so arranged that said ammonia and solvent medium entering said dissolving means therethrough come into direct contact with each other in a zone within said means to thereby form a solution.

* * * * *